Jan. 9, 1951 S. A. HALL 2,537,752

PHONOGRAPH RECORD CHANGER

Filed Aug. 23, 1945 4 Sheets-Sheet 1

INVENTOR.
Stanley A. Hall
BY
Woodling and Krost
attys.

Jan. 9, 1951

S. A. HALL 2,537,752

PHONOGRAPH RECORD CHANGER

Filed Aug. 23, 1945

4 Sheets-Sheet 2

INVENTOR.

Stanley A. Hall

BY

Strandling and Krost attys

Jan. 9, 1951 S. A. HALL 2,537,752

PHONOGRAPH RECORD CHANGER

Filed Aug. 23, 1945 4 Sheets-Sheet 3

INVENTOR.
Stanley A. Hall
BY
Woodling and Krost
attys

PHONOGRAPH RECORD CHANGER

Filed Aug. 23, 1945 4 Sheets-Sheet 4

INVENTOR.
Stanley A Hall
BY
Spaulding and Kroot
attys.

Patented Jan. 9, 1951

2,537,752

UNITED STATES PATENT OFFICE 2,537,752

PHONOGRAPH RECORD CHANGER

Stanley A. Hall, Ottawa, Ontario, Canada, assignor, by mesne assignments, to Cornell-Dubilier Electric Corporation, South Plainfield, N. J., a corporation of Delaware Application August 23, 1945, Serial No. 612,235
In Canada July 20, 1945

11 Claims. (Cl. 274—10)

My invention relates in general to phonograph record changers and more particularly to a phonograph record changer which is adapted to play continuously a supply of records without stopping the machine.

An object of my invention is the provision of a phonograph record changer having a record supply and feeding device and a record storage and receiving device whereby the records are taken from the record supply and feeding device and positioned for playing and then transferred to the record storage and receiving device.

Another object of my invention is the provision of a turn-table pivot drum which may be tumbled over by a Geneva gear device so that throughout a portion of the tumbling operation a record may be placed by the record supply and feeding device upon the turn-table pivot drum and moved in position for playing after which the turn-table pivot drum is further moved to its final stage of tumbling movement for placing or discharging the played record into the record storage and receiving device.

Another object of my invention is to provide for loading a record which is to be played on my turn-table at the same time a played record is being discharged from the turn-table.

Another object of my invention is the provision of a double turn-table whereby one of the turn-tables is adapted to receive the record to be played and the other turn-table is adapted to discharge the played record.

Another object of my invention is the provision of a double turn-table whereby when one of the turn-tables is being used to support the playing record while the other turn-table is used as a driving drum which may be driven by any suitable arrangement from the driving motor.

Another object of my invention is the provision of an endless record supply and feeding conveyor which holds the record individually without the records contacting each other.

Another object of my invention is the provision of an endless record storage and receiving conveyor which receives the played records without allowing the records to touch one another.

Another object of my invention is the provision of rendering my device adaptable for records of different diameters.

Another object of my invention is the provision of a device in which the pick-up is not required to be raised when one record is automatically changed for another record.

Another object of my invention is the provision of a turn-table which is adapted to be lowered with respect to the pick-up and then rotated or tumbled over whereby another turn-table with the record to be played thereon is brought into playing position with the pick-up.

Another object of my invention is the provision of a record changer which has no working or operating parts above the record being played except for the pick-up.

Other objects and a fuller understanding of my invention may be had by referring to the following description and claims, taken in conjunction with the accompanying drawings in which, Fig. 1 is a front elevational view of a record changer embodying the features of my invention.

Figure 2:
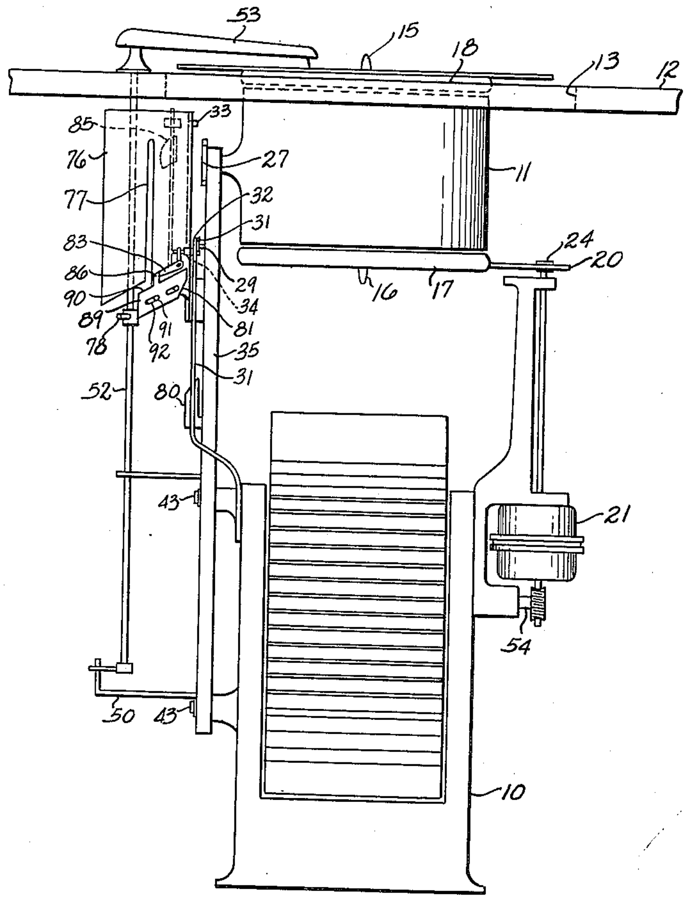
Fig. 2 is a side elevational view of Fig. 1.
Figure 3:
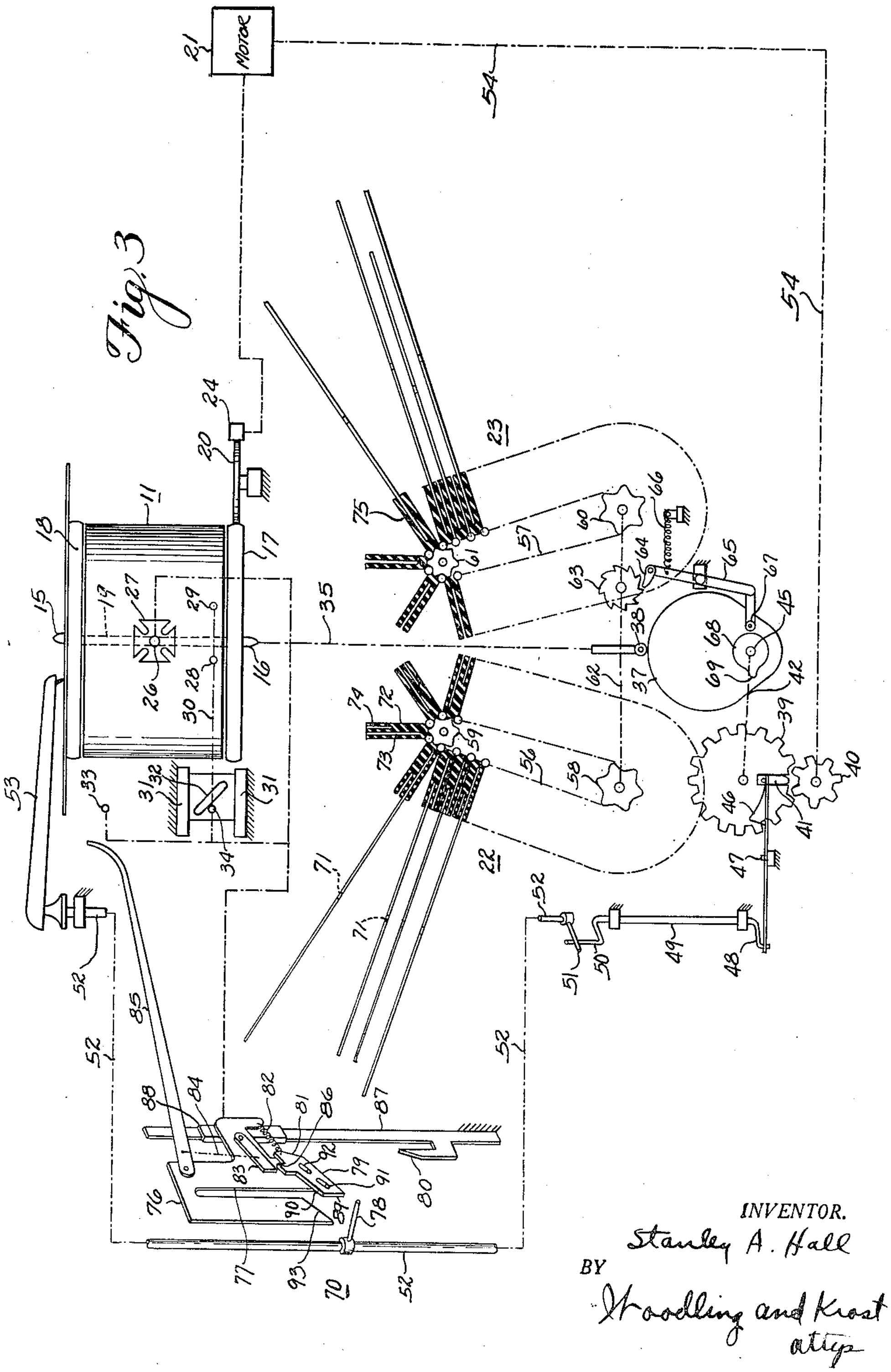
Fig. 3 is a diagrammatic illustration of the operating parts of my invention and shows a record in playing position.
Figure 4:
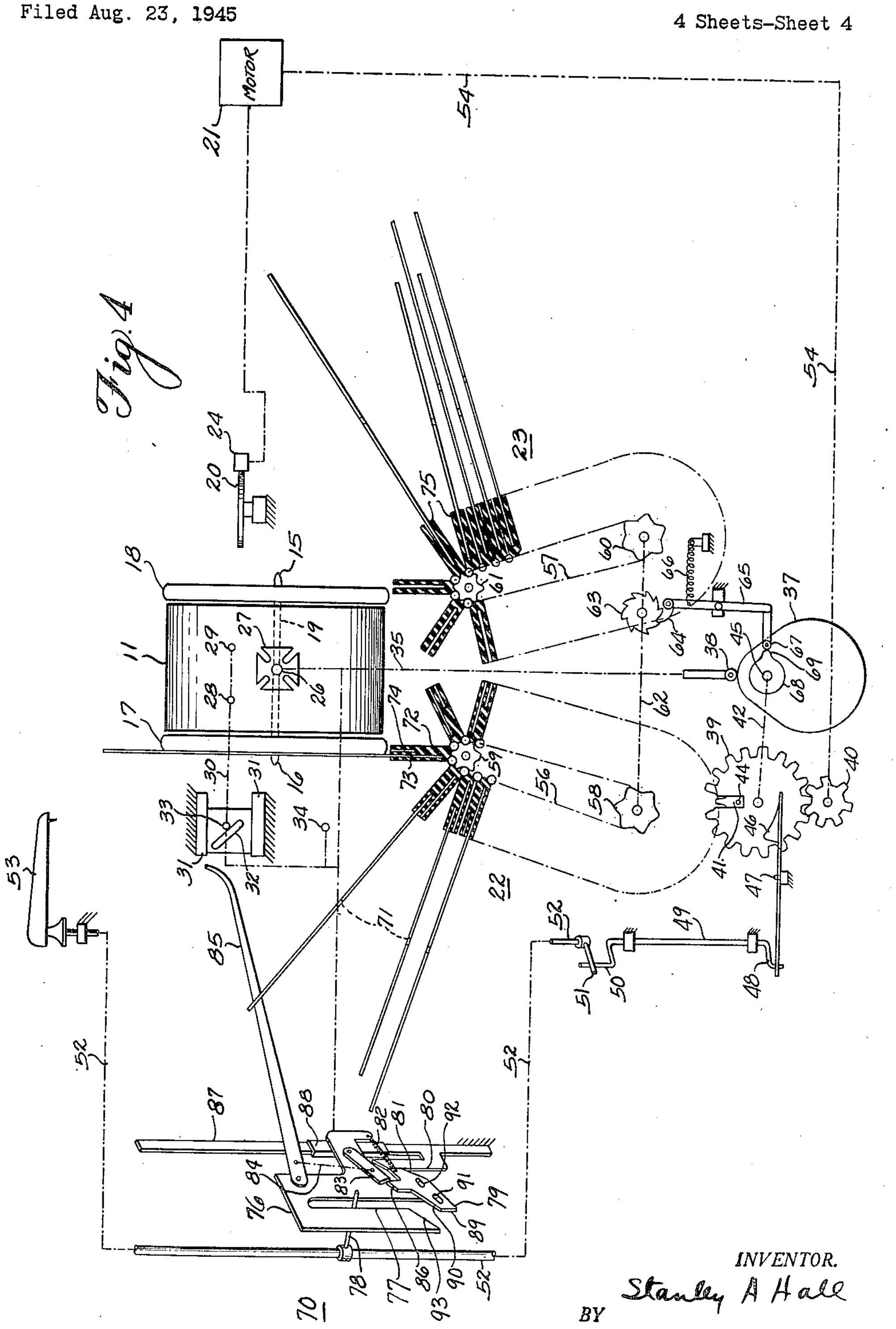
Fig. 4 is a view similar to Fig. 3 but shows the turn-table in a position for receiving a new record to be played and for discharging the old record which has been played.

With reference to the drawings, my invention comprises a base 10 having on one side thereof a record supply and feeding device 22 and on the other side thereof a record storage and receiving device 23, a double turn-table pivot drum 11 which is pivotally mounted above the base 10, and a motor 21 which is adapted to operate the working parts and the turn-table for playing the record. The Figs. 3 and 4 diagrammatically illustrate the working parts of my invention and the dash-dot-lines illustrate the manner in which the working parts are associated and operated with respect to each other. The entire record changing device may be mounted in any suitable cabinet having a cabinet top panel 12 provided with a record hole 13 through which the record which is to be played is elevated to contact the record pick-up indicated by the reference character 53. Figs. 2 and 3 show the record in its elevated playing position.

Figure 1:
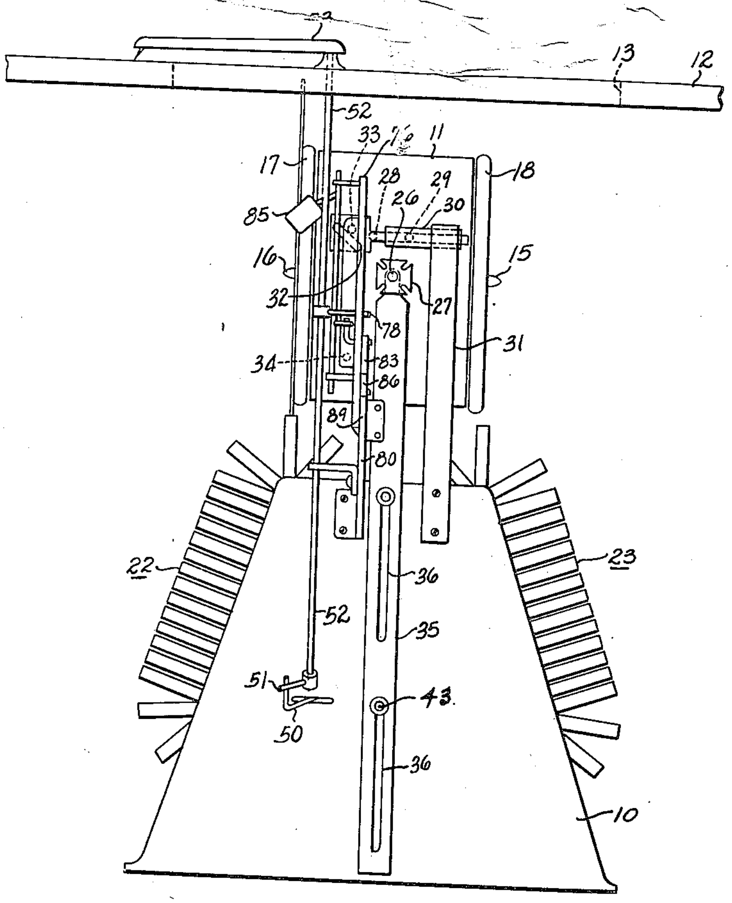

The double turn-table pivot drum 11 has two turn-tables; namely, the turn-table indicated by the reference character 17 and the turn-table indicated by the reference character 18. The turn-tables 17 and 18 are of like construction and are inter-connected by a turn-table shaft 19 whereby the two turn-tables are operatively connected together. In Fig. 3 the turn-table 18 is shown as supporting the record being played and the turn-table 17 is shown as being the one driven by an idler wheel 20 which is driven by a motor wheel 24 mounted on the motor 21. The turn-table 17 may be provided with a centering pin 16 for centering the record and the turn-table 18 may be provided with a centering pin 15 for centering the record. The double turn-table pivot drum is pivotally supported on one side by a trunnion 26 carried by a sliding upright support 35. As illustrated in Figs. 1 and 2 the sliding upright support may be provided with elongated slots 36 and slidably connected to the base 10 by suitable connecting bolts 43. The sliding upright support may be elevated up-and-down for raising and lowering the double turn-table pivot drum. The sliding upright support 35 may be raised and lowered by any suitable means mounted within the base 10 and as shown in Fig. 3 I employ a raising cam 37 having a riding wheel 38 engaging the exterior surface thereof. The raising cam 37 is mounted on a shaft 45. As the raising cam 37 is rotated the slidable upright support 35 is adapted to raise and lower the double turn-table pivot drum 11. The cam 37 may be driven by a one-cycle gear 39 which is driven by a motor-driven gear 40 from a shaft 54 indicated in Figs. 3 and 4 by the dash-dot-line 54. The motor-driven gear 40 is operated continuously by the motor 21. Any suitable arrangement may be employed to drive the one-cycle gear 39 through one complete cycle for raising and lowering the double turn-table pivot drum, and as illustrated I employ a slidable, disengageable tooth 41 which is adapted to fall down by gravity and engage the space between two teeth on the driving gear 40 and thereby start the cycle. The tripping of the slidable tooth for initiating a one-cycle turning of the gear 39 is governed by the pick-up lever 53. Thus, when the record has been completely played and the pick-up arm 53 swings towards the centering pin, the pick-up arm 53 during its inward swinging movement rotates a shaft 52 which provides for swinging a release arm 46 out of engagement with a pin 44 mounted on the slidable tooth 41 and thereby permit the slidable tooth to drop into engagement with the motor gear 40. The shaft 52 has on the bottom end an actuating pin 51 which is adapted to engage a crank 50 for turning a secondary shaft 49 mounted in the base 10. The lower end of the secondary shaft 49 is provided with a crank 48 which when the pick-up lever 53 swings towards the centre of the record, after the record has been played, swings the arm 46 about a pivot 47 whereby the end of the releasing arm 46 that is engaging the pin 44 is moved away from the pin thereby releasing the slidable tooth 41 for dropping into a toothed space on the gear 40. The one-cycle gear 39 as it is operated through a one-cycle movement turns the raising cam 37 through means of a shaft indicated by the dash-dot-line 42 in Figs. 3 and 4 of the drawings. The shaft 45 that carries the cam 37 is also provided with a secondary cam 68 having a raised tip 69 provided thereon which is adapted, through a train of parts, to actuate the record supply and feeding device 22 and the record storage and receiving device 23. As the cam 68 revolves the tip 69 provides for operating a rider wheel 67 that operates a pivotally mounted lever 65 for actuating a ratchet wheel 63 through means of a pawl 64. A spring 66 is adapted to keep the rider wheel 67 riding on the surface of the cam 68. The spring 66 also returns the pawl 64 to a position for engaging a new tooth. The ratchet wheel 63 may be mounted on a shaft 62 which when rotated is adapted to operate two driving sprocket wheels 58 and 60. The driving sprocket wheel 58 is adapted to drive an endless chain 56 which carries a plurality of record holder blocks 72 of the record supply and feeding device 22. The endless chain 56 for the record supply and feeding device 22 is adapted to operate between the driving sprocket 58 and an idle sprocket 59. The endless chain 57 carrying the record holder blocks 75 for the record storage and receiving device 23 is adapted to operate upon the driving sprocket wheel 60 and an idle sprocket wheel 61. Therefore, as the tip 69 on the cam 68 operates the ratchet wheel 63 for a distance of one tooth the record holder blocks 72 are moved forward a small distance for progressively feeding the records to the receiving turn-table for the double turn-table pivot drum and the record holder blocks 75 are moved for progressively receiving the played records from the discharging turn-table. The Fig. 4 shows a record holder block 72 of the record supply and feeding device placing or feeding a record upon the pin 16 of the turn-table 17 while the record holder block 75 of the record storage and receiving device has just received a played record. The record holder block 75 is swung downwardly at the same time that the record holder block 72 is swung upwardly. This upward swinging of the record holder block 72 at the same time that the record holder block 75 swings downwardly is effected by one tooth movement of the ratchet wheel 63.

The turning of the double turn-table pivot drum 11 about the trunnion 26 may be accomplished in any suitable manner and as illustrated I provide a Geneva gear 27 having four diagonally disposed slots therein. The slots are adapted to engage Geneva pins 28 and 29 which are supported by a slidably and transversely movable sliding rod 30 supported by a support 31 from the base 10. In order to align the Geneva pins with the proper slot in the Geneva gear, they are adapted to be shifted laterally by means of a block having an angle cam 32. Upon the downward movement of the double turn-table pivot drum 11, a pin 33, carried by a vertical member mounted to the slidably upright support 35, is adapted to engage the angle cam 32 and shift the Geneva pins 28 and 29 to the left as shown in Fig. 4 of the drawings. Upon the upward movement of the double turn-table a pin 34 is adapted to engage the opposite side of the angle cam 32 and shift the two Geneva pins 28 and 29 to the right, as shown in Fig. 3. The Geneva pins 28 and 29 are shifted from right to left in order to align them with the proper slots in the Geneva gear 27 for rotating or tumbling the double turn-table drum 11 about the trunnion 26.

After the record has been swung into place upon the turn-table 17, for example, as shown in Fig. 4, the double turn-table drum 11 is first raised by the cam 37 until the upper right hand slot in the Geneva gear engages the Geneva pin 29. The record is now removed from the holder block 72. Further raising of the turn-table by the cam 37 causes the Geneva gear to rotate or tumble the double turn-table drum in a clockwise direction until the turn-table 17 and the record thereon assumes a horizontal position, after which the cam 37 continues to raise the turn-table drum 11 until it contacts the pick-up 53, in which position the record is in readiness for playing operation. The idle wheel 20 is now engaging the turn-table 18. Upon the downward movement of the double turn-table pivot drum, the lower left hand slot in the Geneva gear engages the Geneva pin 28 and provides for rotating or tumbling the drum until the two turn-tables 17 and 18 are in a vertical position, after which the drum is continued to be lowered to the position as shown in Fig. 4 during which lowering movement the played record is slid into a holder block 75. The drum 18 during the lowering movement is in vertical alignment with a record holding block 75 so that when the drum is lowered the played record is slid into the slot of the record holder block.

My invention is adapted to play records of various diameters such, for example, as a 10 inch record of a 12 inch record in any sequence. The positioning of the pick-up arm 53 either for a 10 inch record or for a 12 inch record is governed by a selector device indicated by the reference character 70, see particularly Figs. 3 and 4 of the drawings. The selector device 70 comprises a slotted plate 76 which is adapted to be slidably moved in a vertical position upon a guide rod 87 by means of a guide block 88 that surrounds the guide rod 87. The slotted plate 76 is provided with an elongated vertical slot 77 into which an actuating pin 78 may slide. The actuating pin 78 is connected to the shaft 52 which turns the pick-up 53. For selecting the position for the pick-up either for a 10 inch record or a 12 inch record the slotted plate 76 is moved up and down in accordance with the vertical movements of the double turn-table drum 11. The selection between a 10 inch and a 12 inch record is effected by a selecting slide 79 which is horizontally slidable upon pins 91 carried by the slotted plate 76. The pins 91 are mounted in elongated slots 92 in the selecting slide 79. With reference to Fig. 3, as the slotted plate 76, and the selecting slide 79 carried thereby, is lowered, as it will be when the double turn-table drum 11 is lowered, the rearward surface 81 of the selecting slide 79 engages a stationary cam 80, and as a result the horizontally selecting slide 79 is moved away from the guide rod 87 until the latch 83 engages a latch hook or notch 86. With the latch 83 engaging the latch hook 86, the selective slide 79 is now set for a 10 inch record. The position for a 10 inch record is shown in Fig. 4. As the double turn-table drum 11 is elevated, the slotted plate 76 is likewise elevated and the top sloping cam edge 90 of the selecting slide 79 engages the pin 78. Inasmuch as the top edge 90 of the selecting slide 79 is sloping, it causes the pin 78 to rotate the shaft 52 until the pin 78 clears the end 89 of the selecting slide 79. The clearance of the end 89 with reference to the pin 78 sets the pick-up 53 in position for a 10 inch record.

When a 12 inch record is placed upon the turn-table 17 as, for example, in Fig. 4 and after the turn-table is raised to the point at which the Geneva gear engages the Geneva pin 29, being the point at which the double turn-table is rotated or tumbled in a clockwise direction for swinging the record to a horizontal position, it is to be noted that as the record is being swung to its horizontal position the edge thereof engages a 12-inch trip lever 85 for raising the latch 83 from engagement with the latch hook 86, and then a spring 82 draws the selecting slide 79 toward the guide rod 87 until the ends of the elongated slots 92 engage the pins 91, at which point the selecting slide is in the 12 inch position. As the slotted plate 76 is raised, the selecting slide 79 engages the pin 78, and as the pin 78 clears the end 89 of the selecting slide 79, the pin 78 has caused the shaft 52 to be rotated sufficiently so the pick-up 53 is then set in position for a 12 inch record. The trip lever 85 may be connected by any suitable means to raise the latch 83 such, for example, as shown by the dash-dot-line 84 in Figs. 3 and 4.

The Fig. 3 illustrates the starting point of the cycle of operation, and this starting point is initiated when the pick-up lever 53 swings towards the centre of the record and trips the single slidable tooth 41 whereby it may drop into engagement with the gear 40 which starts the cam 37 through a cycle of operation for first lowering the double turn-table pivot drum 11 until the Geneva gear is set into operation after which the Geneva gear rotates or tumbles the double turn-table drum ninety degrees until the turn-tables 17 and 18 are vertical. The cam 37 continues to operate for lowering the double turn-table drum after it has been tumbled and thereby places or slides the played record into a record holding block 75. At this point, the tip 69 engages the rider wheel 67 for moving the ratchet wheel 63 one tooth forward for swinging a new record onto the pivot pin 16 in Fig. 4 and for swinging the discharged record off the pin 15 as illustrated. At the time that the new record is swung upon the pin 16, the rider wheel 38 on the cam 37 is in its lowermost position. Continued operation of the cam 37 now begins to raise the double turn-table drum 11 until the Geneva gear is set into operation, at which point the new record is free of the slot in the record holder block 72. The Geneva gear then rotates or tumbles the drum until the new record is in a horizontal position. The cam 67 continues to rotate further for elevating the new record until it contacts the pick-up 53. At this point, the release arm 46 raises the slidable tooth 41 to complete the cycle of operation by stopping the one-cycle gear 39. As the new record approaches the pick-up it is raised very gently or slowly so that it does not damage the pick-up needle. After the record has been completely played, the pick-up lever swings inwardly and starts the cycle again for loading a new record and discharging the played record. Upon downward movement of drum 11, the pin 78 engages the bottom sloping end 93 of the slotted plate 76 and then slides into the elongated slot 77, thus swinging the pick-up arm 53 outwardly preparatory to playing the next record. As illustrated in Figs. 3 and 4 the record holder block 72 is provided with a shallow slot 74 for receiving a 10 inch record and a deep slot 73 for holding a 12 inch record whereby the holes in the records 71 are always in position for sliding over the centering pin regardless of whether the record is a 10 inch record or a 12 inch record. The record holder blocks 72 may be constructed of pliable material such as rubber so that it may give with respect to the face of the turn-table as a new record is swung against the turn-table. The record holder blocks 75 for the storage and receiving device are provided with a single slot deep enough to hold the records regardless of their diameter. The playing is stopped when all of the records in the supply and feeding device 22 have been played and automatically placed in the blocks 75 of the storage and receiving device 23. The playing may again be repeated by transferring the records from the storage and receiving device 23 to the supply and feeding device 22. The entire operation may be stopped by turning the motor 21 off. Although I have shown and described my invention with a certain degree of particularity, it is understood that changes may be made therein without departing from the spirit of the invention which are included within the scope of claims hereinafter set forth.

I claim as my invention:

1. In a phonograph record changer having a swingably mounted pick-up device operated by the record being played, a double turn-table device having a first and a second turn-table operatively connected together, said first and second turn-tables being spaced apart and mounted to revolve in planes substantially parallel to each other, driving means for operating the turn-tables, pivotal means for pivotally supporting the double turn-table device, cyclic actuating means for rotating the double turn-table device on the pivotal means, said cyclic actuating means rotating the double turn-table device through a tumbling cycle including a first horizontal movement which tumbles the turn-table device from a first position to a first vertical position and a second movement which tumbles the turn-table device from the first vertical position to a second horizontal position, in said first horizontal position the first turn-table being disposed to support a playing record and the second turn-table being disposed to be contacted by the driving means for revolving the two turn-tables and in said second horizontal position the second turn-table being disposed to support a playing record and the first turn-table being disposed to be contacted by the driving means for revolving the two turn-tables, said cyclic actuating means including first movement means for actuating the double turn-table device from the first horizontal position to the first vertical position, said first movement means first lowering the double turn-table device to a point below the pick-up device, then tumbling the double turn-table through substantially ninety degrees until the planes of the two turn-tables are disposed in substantially a vertical position and then finally lowering the double turn-table device to the first vertical position, means for removing the played record from the first turntable in the said first vertical position, means for positioning a new record on the second turntable in the said first vertical position, said cyclic actuating means including second movement means for actuating the double turn-table device from the first vertical position to the second horizontal position, said second movement means first raising the double turn-table device to a point below the pick-up device, then tumbling the double turn-table device through ninety degrees until the planes of the two turn-tables are substantially horizontal and then finally raising the double turn-table device to the second horizontal position where the new record is in a playable position under the pick-up device.

2. An automatic record changer for a phonograph comprising, cyclic actuating means adapted to be actuated through a cycling movement, turntable means having first and second turntables disposed in parallel relationship on a first axis, first means operated by the cyclic actuating means for vertically lowering a played record on said first turntable from its first horizontal playable position to a first intermediate position, rotating said turntable means on a second axis substantially 90 degrees and then lowering said turntable means still further to a first vertical position to discharge said record, and second means operated by the cyclic actuating means for placing a new record on said second turntable in said first vertical position, raising said turntable means to a second intermediate position, rotating said turntable means on said second axis substantially 90 degrees, and then vertically raising said turntable means to a second horizontal playable position.

3. An automatic record changer for a phonograph including, a turntable mechanism having first and second turntables disposed in parallel relationship and rotatably interconnected in axial alignment, said turntable mechanism having a tumbling axis at right angles to the rotational axis of said turntables, first means for vertically lowering said turntable mechanism a predetermined distance from its horizontal playable position, tumbling means for tumbling said turntable mechanism substantially 90 degrees throughout a mid-portion of said predetermined distance, and second means for vertically raising said turntable mechanism said predetermined distance to said horizontal playable position, said tumbling means tumbling said turntable mechanism substantially 90 degrees during a mid-portion of said predetermined distance.

4. An automatic record changer for a phonograph including, a turntable mechanism, first means for vertically lowering said mechanism a predetermined distance from its horizontal playable position, rotating means for rotating said turntable mechanism substantially 90 degrees on an axis other than the axis of revolution of said turntable mechanism, means for initiating the said rotational movement after said vertical lowering movement has commenced, means for completing said rotational movement before said vertical lowering movement has ceased, second means for vertically raising said turntable mechanism said predetermined distance to its horizontal playable position, said rotating means rotating said turntable mechanism substantially 90 degrees, means for initiating said rotational movement after said vertical raising movement has commenced, and means for completing said rotational movement before said vertical raising movement has ceased.

5. An automatic record changer for a phonograph including, a turntable mechanism, a record supply and feeding device for holding records prior to being played, a record storage and receiving device for receiving records after they have been played, first means for vertically lowering said mechanism a first predetermined distance from its first horizontal playable position, said first predetermined distance including first, second and third distances, said first means vertically lowering said turntable mechanism during said first distance, rotating means for rotating said turntable mechanism on a horizontal axis substantially 90 degrees within said second distance, said turntable mechanism discharging its played record into said record storage and receiving device during said third distance, second means for simultaneously moving said record supply and feeding device and said record storage and receiving device to remove said played record from said first turntable and to place a new record on said second turntable, and third means for vertically raising said turntable mechanism a second predetermined distance to a second horizontal playable position, said second predetermined distance including first, second and third distances, said turntable mechanism removing said new record from said record supply and feeding device during said first distance, said rotating means rotating said turntable mechanism within said second distance, said third means vertically raising said turntable mechanism the remaining third distance of said predetermined distance to said second horizontal playable position.

6. An automatic changer of disc records, comprising, a turntable device having a first and a second turntable, a feeding device for supplying and feeding records to said turntables, a receiving device for receiving and storing records discharged from said turntables, a horizontally swingable pickup for obtaining intelligence from said records, a selector device for selecting the starting position of said pickup according to the size of said record, cyclic actuating means for actuating said feeding, receiving, selector and turntable devices in response to the swinging movements of said pickup, and drive means for said cyclic actuating means and said turntables, said cyclic actuating means including means for vertically lowering said turntable device a predetermined distance from its horizontal playable position, means for tumbling said turntable device about a horizontal axis substantially 90 degrees throughout a mid-portion of said predetermined distance, means for actuating the feeding and receiving devices for placement of a new record on one of said two turntables and removal of the played record from the other of said two turntables, means for vertically raising said turntable device said predetermined distance to a horizontal playable position, and means for tumbling said turntable device about said horizontal axis substantially 90 degrees throughout a mid-portion of said predetermined distance.

7. An automatic changer of disc records, comprising, a turntable device having a first and a second turntable, a feeding device for supplying and feeding records to said turntables, a receiving device for receiving and storing records discharged from said turntables, a horizontally swingable pickup for obtaining intelligence from said records, a selector device for selecting the starting position of said pickup according to the size of said record, cyclic actuating means for actuating said feeding, receiving, selector and turntable devices in response to the swinging movements of said pickup, and drive means for said cyclic actuating means and said turntables, said turntable device including, a mechanism with the two said turntables disposed in parallel relation and axially interconnected, and means for tumbling said turntable device about a tumbling axis disposed substantially at right angles to the axis of said turntables to position said turntables in position for cooperation with said feeding and receiving devices, said drive means driving one of said turntables when a record is being played on the other of said turntables.

8. An automatic changer of records, comprising, a turntable device having a first and a second turntable, a feeding device for supplying and feeding records to said turntables, a receiving device for receiving and storing records discharged from said turntables, cyclic actuating means for actuating said feeding, receiving, and turntable devices, and drive means for said cyclic actuating means and said turntables, said turntable device including, a mechanism with the two said turntables disposed in parallel relation, and a tumbling axis disposed substantially at right angles to the axis of said turntables, said cyclic actuating means including, a cam, a cam follower riding on said cam for imparting a vertical lowering and elevating motion of a predetermined distance to said turntable device, a Geneva gear for cooperating with a Geneva pin to rotate said turntable device substantially 90 degrees on its tumbling axis during a mid-portion of said vertical lowering and elevating motions, and feeding means for said feeding and receiving devices for effecting substantially simultaneous placement of a new record on one of said two turntables and removal of the played record from the other of said two turntables substantially at the lowermost position of said vertical motion.

9. An automatic changer of disc records, comprising, a turntable device having a first and a second turntable, a feeding device for supplying and feeding records to said turntables, a receiving device for receiving and storing records discharged from said turntables, a horizontally swingable pickup for obtaining intelligence from said records, cyclic actuating means for actuating said feeding, receiving, and turntable devices in response to the swinging movements of said pickup, and drive means for said cyclic actuating means and said turntables, said turntable device including, a mechanism with the two said turntables disposed in parallel relation, and a tumbling axis disposed substantially at right angles to the axis of said turntables, said cyclic actuating means including, a one-cycle gear for engaging a drive gear of said drive means, a cam driven by said one-cycle gear, a cam follower riding on said cam for imparting a vertical lowering and elevating motion of a predetermined distance to said turntable device, a Geneva gear on said turntable device for cooperating with a Geneva pin to rotate said turntable device substantially 90 degrees on its tumbling axis during a mid-portion of said vertical lowering and elevating motions, and feeding means for said feeding and receiving devices for effecting substantially simultaneous placement of a new record on one of said two turntables and removal of the played record from the other of said two turntables substantially at the lowermost position of said vertical motion.

10. Cyclic actuating means for the turntable device of an automatic record changer, comprising, a tumbling axis for said turntable device substantially perpendicular to the rotational axis of said turntable device, cam and follower means for providing to said turntable device a first and a second translatory motion substantially parallel to said turntable rotational axis of a predetermined distance, and Geneva cross and pin means to tumble said turntable device a given angle on its tumbling axis during a midportion of said translatory motions, said angular tumbling during the first motion establishing said turntable device in a first position to discharge and receive records, and said angular tumbling during the second motion establishing said turntable device in a second position to rotate said turntable device.

11. Cyclic actuating means for the turntable device of an automatic record changer, comprising, a tumbling axis for said turntable device substantially perpendicular to the rotational axis of said turntable device, cam and follower means for providing to said turntable device a vertical lowering and elevating motion substantially parallel to said turntable rotational axis of a predetermined distance, Geneva cross and pin means to tumble said turntable device substantially 90 degrees on its tumbling axis during a midportion of said vertical lowering and elevating motions, said angular tumbling during the lowering motion establishing said turntable device in a vertical position to discharge and receive records, and said angular tumbling during the elevating motion establishing said turntable device in a horizontal position to rotate said turntable device.

STANLEY A. HALL.

REFERENCES CITED

The following references are of record in the file of this patent:

UNITED STATES PATENTS

| Number | Name | Date |
|---|---|---|
| 1,508,572 | Ord | Sept. 16, 1924 |
| 1,508,986 | Ord | Sept. 16, 1924 |
| 1,888,660 | Ferguson | Nov. 22, 1932 |
| 1,954,246 | Jones | Apr. 10, 1934 |
| 2,004,016 | Smyth | June 4, 1935 |
| 2,068,449 | Downs | Jan. 19, 1937 |

FOREIGN PATENTS

| Number | Country | Date |
|---|---|---|
| 315,682 | Great Britain | July 16, 1929 |

Certificate of Correction

Patent No. 2,537,752 January 9, 1951

STANLEY A. HALL

It is hereby certified that error appears in the printed specification of the above numbered patent requiring correction as follows:

Column 7, line 20, strike out the word "horizontal" and insert the same in line 22, before "position";

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*